United States Patent [19]
Gard et al.

[11] Patent Number: 4,720,074
[45] Date of Patent: Jan. 19, 1988

[54] UMBRELLA SUPPORT BRACKET

[76] Inventors: Ronald C. Gard, 2 Woodward Place; Raymond P. St. Ledger, 5 Warrabina Avenue, both of St. Ives, New South Wales, Australia, 2075

[21] Appl. No.: 849,743

[22] Filed: Apr. 9, 1986

[30] Foreign Application Priority Data

Apr. 9, 1985 [AU] Australia .................. PH00048

[51] Int. Cl.⁴ ............................................. F16M 13/00
[52] U.S. Cl. .................... 248/514; 248/314; 248/316.1; 248/540; 403/310
[58] Field of Search .............. 248/511, 534, 540, 541, 248/523, 514, 222.3, 412, 309.1, 313, 314, 316.1; 224/274, 915; 403/305, 309, 310, 313, 315

[56] References Cited

U.S. PATENT DOCUMENTS

| | | | |
|---|---|---|---|
| 35,355 | 5/1862 | Ludden | 403/310 |
| 2,042,353 | 5/1936 | Morehouse | 403/315 |
| 2,169,965 | 8/1939 | Niedermaier | 248/314 X |
| 2,708,088 | 5/1955 | Steinke | 248/309.1 X |
| 3,304,036 | 2/1967 | Davis | 248/514 |
| 3,602,466 | 8/1971 | Drowns | 248/314 X |
| 3,802,653 | 4/1974 | Nyulassie | 248/541 X |
| 3,848,838 | 11/1974 | Thomas | 248/541 |

FOREIGN PATENT DOCUMENTS

| | | | |
|---|---|---|---|
| 522693 | 9/1953 | Belgium | 248/523 |
| 55488 | 1/1922 | Sweden | 403/310 |

Primary Examiner—J. Franklin Foss
Assistant Examiner—David L. Talbott
Attorney, Agent, or Firm—Stiefel, Gross, Kurland & Pavane

[57] ABSTRACT

A receptacle for releasably attaching an umbrella having a bulb type handle to an article such as a golf buggy. The receptacle has several upstanding forked petals capable of resilient radial deflection and a locking ring capable of maintaining the petals in a closed position about the bulb of an umbrella handle.

6 Claims, 7 Drawing Figures

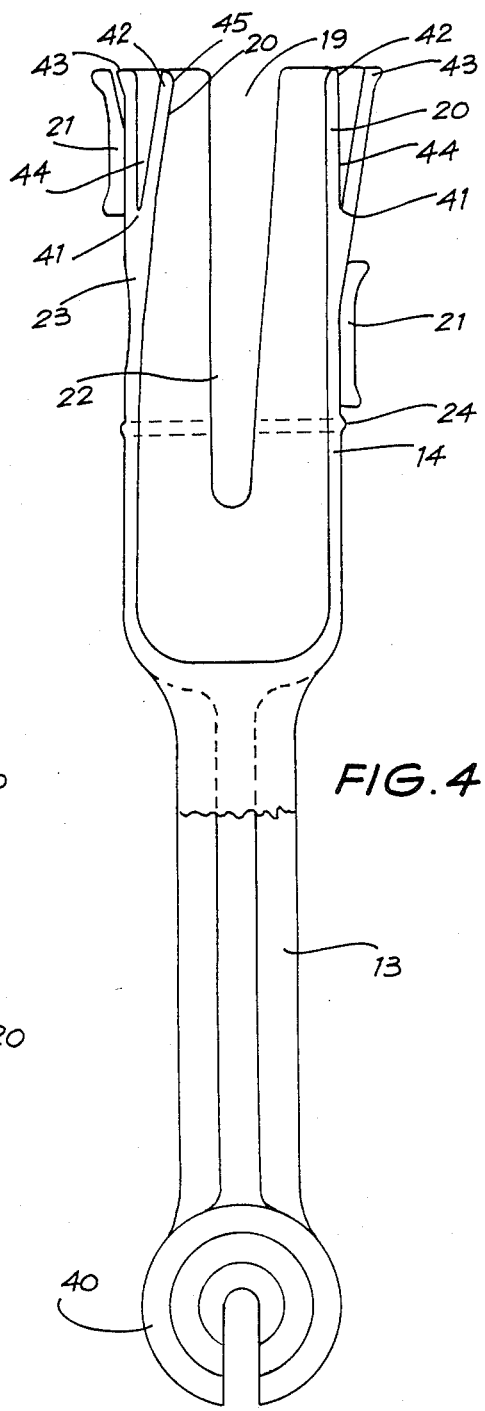

UMBRELLA SUPPORT BRACKET

The present invention relates to apparatus for mounting an umbrella on a golf buggy, lawn mower or other tubular framed article.

As the prevalence of skin cancer is causing increased concern amongst those who pursue outdoor sports and activities more emphasis is now being placed upon avoiding excessive exposure of one's skin to direct sunlight. For many years golfers who are of course exposed to the prevailing atmospheric conditions for extended periods of time have carried umbrellas to protect themselves against sun and rain.

During a game of golf however it can be inconvenient to hold and handle an umbrella as for example one may be standing under an umbrella whilst waiting for a player to vacate a tee whereas it is necessary to put the umbrella down in order to play one's own ball. It may also be necessary to collapse the umbrella before having one's hit in order to prevent it blowing away, particularly as golf umbrellas are oversized as compared to conventional umbrellas.

The present invention seeks to provide a mount capable of locating an open umbrella upon a golf buggy or other tubular structure in such a manner that it may provide shelter.

The term "umbrella" where used herein shall mean an umbrella with a handle terminating at its lower end in a bulb as is common with golfing umbrellas rather than the situation with conventional umbrellas with hooked handles.

According to the present invention there is provided a cupped receptacle adapted to releasably captivate and secure an umbrella handle of the type terminating in a bulb comprising a base portion extending into two or more upstanding arcuate petals defining the sides of the cupped receptacle and capable of resilient radial deflection; a radially inwardly directed protrusion on each petal towards the open end of the cupped receptacle and locking means slidable from a first position adjacent the lower extremity of the petals whereat the locking means does not prevent outward radial deflection of the petals to a locked position about the upper extremities of the petals whereat the locking means prevents radially outward deflection of the petals and maintains the inwardly directed protrusion in such a position that an umbrella may be supported with its bulb captive within the base of the receptacle; means adjacent the base of the receptacle to secure same to a stable object.

A number of embodiments of the present invention will now be described with reference to the accompanying drawings wherein:

FIG. 4 is a cut-away side elevation of an alternate receptacle in accordance with the present invention;

FIG. 5 is a top plan view of the embodiment of FIG. 4 shown partially in the open and partially in the closed modes.

Figure 1:
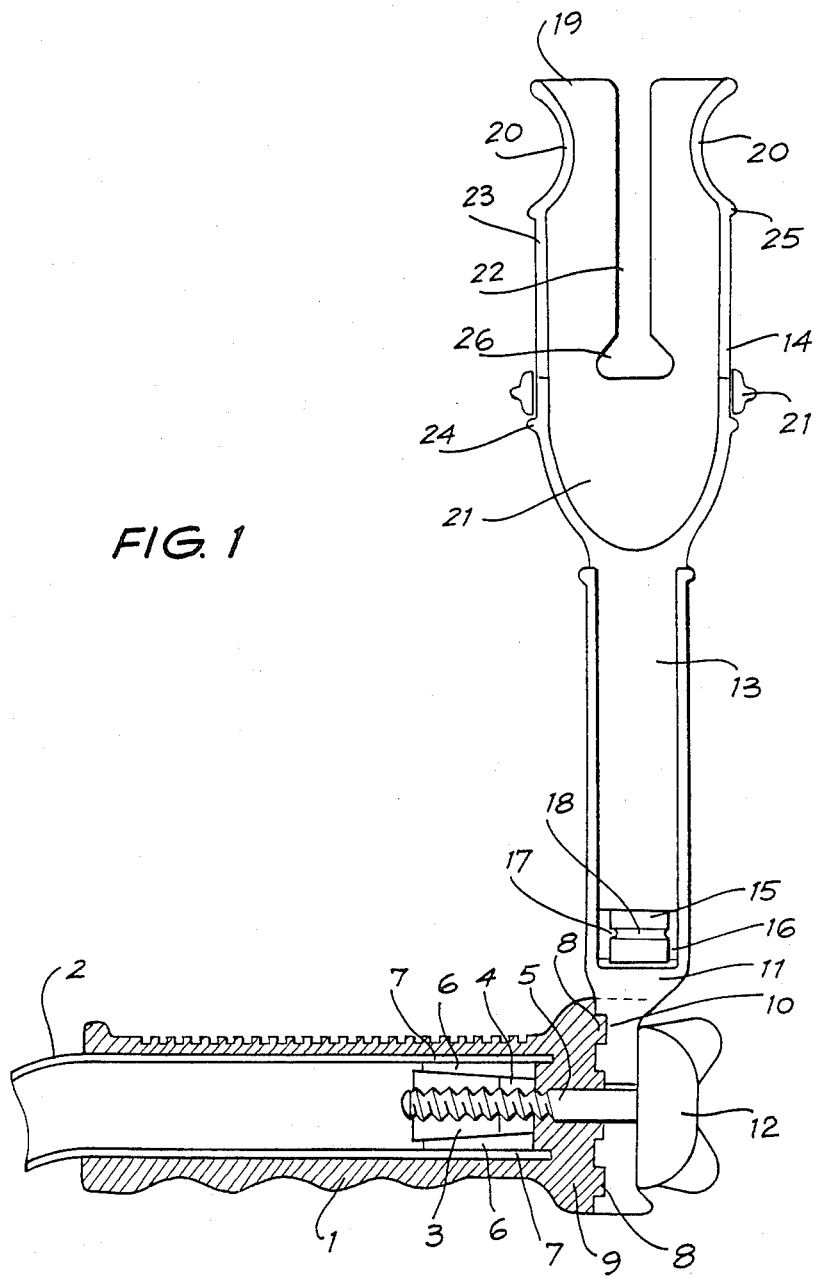
FIG. 1 is a cut-away side elevation of an article in accordance with the present invention.

The embodiment of FIG. 1 is provided with a plastic grip 1 adapted to slide over the free upper end of a tubular handle of a golf buggy (not shown) or lawn mower (not shown) thereby securing the apparatus of this invention to such handle. In order that the grip may not twist or slide axially in relation to the handle a taper lock is provided comprising tapered nut 3 which is drawn into tapered recess 4 in the grip by bolt 5 thus urging the internal skirt 6 of grip 1 into a tight locking relationship with the internal surface 7 of the tubular handle 2.

Radial teeth 8 in the end 9 of the grip 1 are adapted to engage corresponding depressions 10 in arm 11 in order to prevent rotation of the arm about the axis of bolt 5. Such rotation or adjustment may however be facilitated by loosening bolt 5 so that teeth 8 may engage alternative depressions 10 in the base of arm 11. To make such adjustment readily obtainable bolt 5 is provided with a winged head 12.

Arm 11 is substantially tubular above its circular solid base in order that it may receive, in telescoping fashion, the elongated base 13 of cupped receptacle 14. By sliding base 13 axially within arm 11 height adjustment may be provided for an umbrella (not shown) whose bulb type handle (not shown) is intended to be captive and secured within receptacle 14. Elongated base 13 terminates in an eccentric projection 15 which projection fits in turn into an eccentric hole in sleeve 16 thereby forming a cam locking device such that rotation of cup 14 and hence base 13 will releasably lock the base in any one of a potential range of axial relationships with arm 11. It should be noted that the eccentric hole in sleeve 16 carries an annular internally directed flange 17 adapted to cooperate with annular depression 18 in eccentric projection 15 thereby preventing axial movement of said sleeve with respect to said projection.

It should be appreciated that receptacle 14 is constructed such that the bulbous base of an umbrella may be introduced into same through opening 19 past inwardly directed protrusions 20 to an area adjacent the base 13. In order to impart more radial flexibility to the upper portion of the cup 14 above ring 21 the cup may be relieved by two or more (in this case four) axial cuts 22 thus defining two or more petals 23 in the upper area of the cup above ring 21. Once the bulbous base of the umbrella has radially expanded the petals in order to pass inwardly directed protrusion 20, the petals move radially inwards the resume their original position thus retaining the bulb captive between protrusions 20. Protrusions 20 may then provide support for the handle of the umbrella above the bulb. In order that the petals may not accidentaly expand radially thus freeing the bulb, an umbrella ring 21 may be moved from the position shown adjacent lower stop flange 24 to a position (not shown) adjacent upper stop flange 25, thus positively locking the bulb of the umbrella in the lower area of the receptacle beneath the upper stop flange 25. It has been found that four identical axial cuts 22 may advantageously occupy 60 degrees of the circumference of the receptacle when it is constructed of PVC and the cuts may additionally adopt a flattened tear drop shape 26 at their lower extremities in order to provide additional flexibility at such points.

It is of course important that the petals are sufficiently flexible that an undue amount of physical force is not require to insert or remove the bulb of an umbrella handle as for example golf buggies are not allowed upon putting greens and consequently it may be necessary during one game of golf to insert and remove an umbrella from the above apparatus a number of times.

Figure 3:
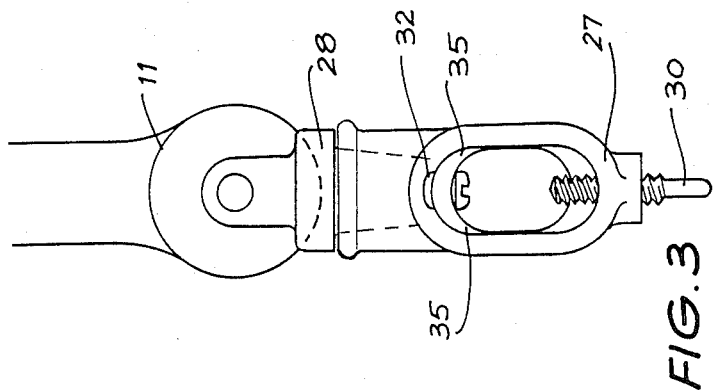
FIG. 3 is an end elevation showing the intermediate mount and elbow of FIG. 2.
Figure 2:
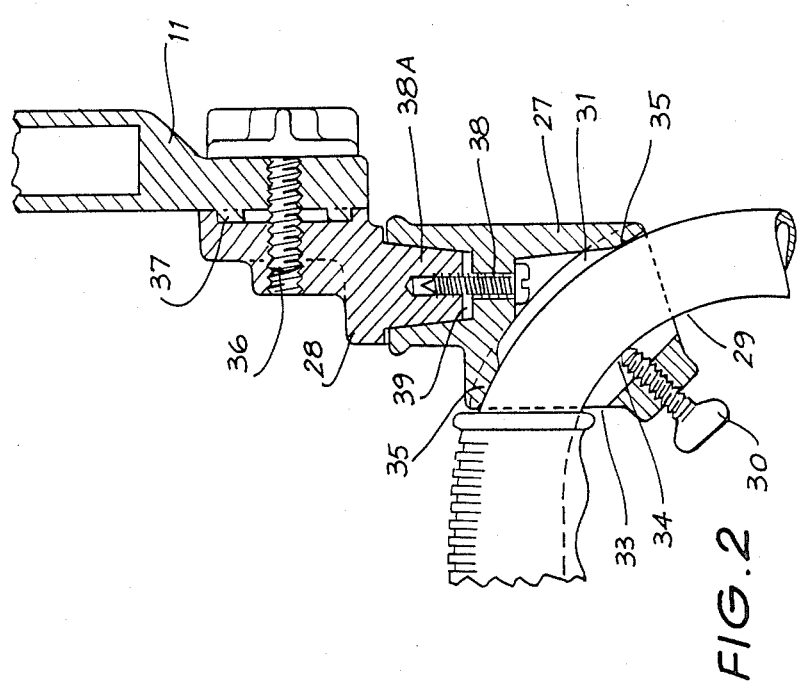
FIG. 2 is a cut-away side elevation of an intermediate mount and elbow adapted to secure a receptacle in accordance with the present invention to a tubular structure.

FIGS. 2 and 3 depict a bracket which may be substituted for grip 1 of FIG. 1 in applications where such grip is inappropriate (for example where the grip assumes a non-horizontal alignment).

The embodiment of FIGS. 2 and 3 incorporates a bracket comprised of elbow portion 27 and intermediate mount 28. Elbow portion 27 is adapted to slide over a radiused portion 29 of a tubular golf buggy handle or the like. The elbow may then be locked in place by grub screw 30. In order that the elbow may accommodate tubular frames of varying diameters and curving through differing radii it should be noted that the elbow is of oval section and relieved at 31 and 32. There is also a considerable clearance at 33. When locked in place the elbow therefore only contacts the tubular frame at the tip 34 of the grub screw 30 and at four contact areas 35.

Intermediate mount 28 is adapted to locate the lower portion of arm 11 in a range of possible relationships to elbow 27. Rotation of arm 11 about the axis of bolt 36 may be achieved by loosening said bolt whereas tightening such bolt results in radially disposed teeth 37 in arm 11 locking into corresponding radial depressions in intermediate mount 28 thus fixing arm 11 with respect to the mount. This rotational adjustment of arm 11 in one plane may be translated through ninety degrees to a perpendicular plane by removing screw 38 and withdrawing square tapered protrusion 38A from square tapered recess 39. The tapered protrusion 38A may then be reinserted in recess 39 after rotation through ninety degrees about the axis of screw 38. In this manner arm 11 may be set up to assume a useful orientation despite varying alignments of elbow 27 brought about by varying configurations in golf buggy tubular frames.

According to the embodiment of FIG. 4 there is provided a cupped receptacle 14 at the top of an elongated base 13, the base 13 being provided with means 40 to facilitate adjustable attachment to a stable object.

This embodiment again employs four petals 23 as may best be viewed from FIG. 5, which petals are separated by four axial cuts 22.

It will be noted that in this embodiment the inwardly directed protrusions 20 take the form of leaf springs affixed to the inner wall of their respective petals at 41 and terminating at their free ends adjacent the upper extremity of the petal and spaced radially inward therefrom. From FIG. 5 it may be seen that these protrusions are arcuate in plan view and concentric with the petals to which they correspond.

This embodiment is designed so as to adopt a normally open equilibrium position when the locking ring 21 is in the lower position as indicated on the right hand side of FIG. 4. In this position the inwardly directed protrusion in the form of a leaf spring extends substantially upwardly rather than inwardly and it is for this reason that the term "inwardly directed protrusion" when used herein refers to the orientation of the protrusion in the closed or locked mode of the receptacle.

In use the bulb of an umbrella (not shown) would be passed through the opening 19 in the cupped receptacle defined by the free ends 42 of the inwardly directed protrusions 20 when the locking ring is in the open mode as depicted at the right hand side of FIGS. 4 and 5. The bulb may freely pass into the receptacle coming to rest adjacent the bottom thereof.

The locking ring 21 may then be raised from its unlocked position about the lower portions of the petals to its locked position adjacent the upper extremities of the petals as depicted at the left hand side of FIGS. 4 and 5. This movement of the locking ring draws the upper extremities 43 of the petals (which diverge outwardly in their equilibrium position) radially inwardly. This radially inward movement of the upper extremity of the petal is designed to cause corresponding radially inward movement of the inwardly directed protrusion 20 such that the free ends 42 of such protrusions come to rest against the shaft of the umbrella or umbrella handle thereby stabilizing same and furthermore restricting opening 19 so as to prevent exit of the bulb (not shown).

It is important that the locking ring does not merely cause the upper portion of petals 43 to move radially inward thereby merely closing angle 44 rather than causing movement of inwardly directed protrusions 20 against the shank of an umbrella. Consequently it is desirable that substantial radially inward deflection of the petals occurs below point 41. This may be achieved by ensuring that the upper extremities of the petals 43 offer at least as much resistance to deflection as the lower portions of the petal. Alternatively the petals may be relieved below point 41 so that they hinge from this point.

Ideally the angle 44 between the inwardly directed protrusions at 20 and the upper portions of petals 43 should ensure that the free ends 42 of the inwardly directed protrusions 20 may come into contact with and hence secure the smallest commonly occurring diameter of umbrella shaft when the ring is in the closed and locked position. When an umbrella having a larger diameter shaft is inserted in the receptacle and the locking ring is placed in the locked position, then some closing of angle 44 will occur as the free end 42 of inwardly directed protrusion 20 comes to rest against such shaft. In this manner the forked nature of the upper extremity of the petals will accommodate varying diameters of umbrella shaft.

It will be noted that lower stop flange 24 is provided for the locking ring to maintain same in its open or unlocked position whereas the outer surface of the upper portions 43 of the petals may be roughened (not shown), as may be the internal surface of the locking ring itself in order to ensure that sufficient friction exists in the locked position to maintain the ring in such mode.

It has been found appropriate for a receptacle having an internal diameter of between 38 and 39 millimeters that the axial cuts commence at a position approximately 30 millimeters above the bottom of the receptacle whereas the distance between point 41 and the upper extremities of the petals and internally directed protrusion is approximately 30 millimeters. The angle 44 between the internally directed protrusion 20 and the upper extremity 43 of the petals in the open equilibrium position may be between 10 and 30 degrees and may furthermore advantageously be on the order of fifteen degrees.

It should be noted from FIG. 4 that the internally directed face of the free end 42 of the internally directed protrusion may be formed as a ramp 45 so as to facilitate ready introduction of a bulb into the opening 19 defined by such free ends.

Figure 6:
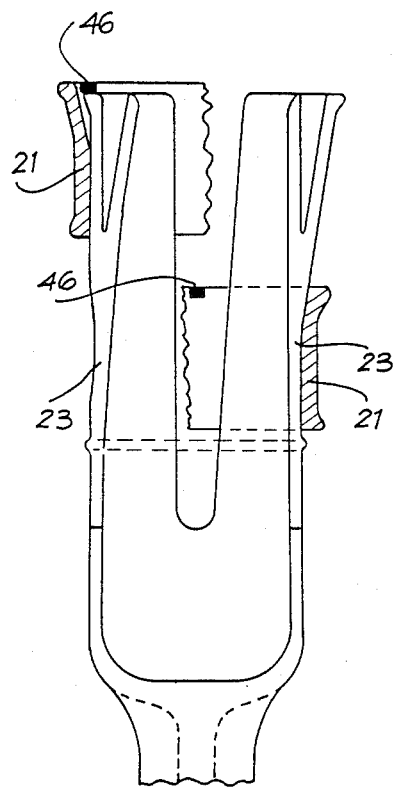
FIG. 6 is a cut-away side elevation of an embodiment similar to that of FIG. 4 but having different ring locking means.

According to FIG. 6 the locking ring is provided with one or more radially inwardly directed lugs 46 adjacent the upper extremity of the internal surface of locking ring 21. These lugs 46 are designed to overlie the upper extremity of a petal hence securing the ring in the locked mode. The ring may be moved down the petals into an unlocked mode by rotating the ring such that the lugs are free to pass down the longitudinal axis of the receptacle along cuts 22.

Figure 7:
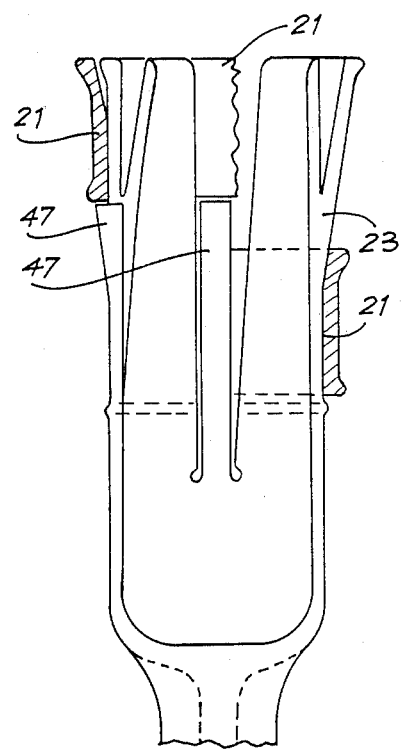
FIG. 7 is a cut-away side elevation of an embodiment similar to that of FIG. 4 but disclosing yet another possible form of ring locking means.

FIG. 7 depicts alternate means for retaining the locking ring 21 in the locked mode utilizing leaf spring members 47.

It will be observed that leaf spring members 47 are formed from the material which would otherwise be removed from longitudinal cuts 22, the spring being joined to the main body of the receptacle at their lower extremity 48 and being of a length such that their upper extremity 49 terminates just below the intended rest position of the locking ring 21 when such ring is in the locked mode. As the entire receptacle is moulded in the open and unlocked mode, the leaf spring members will tend to re-assume such position after the locking ring has passed over the members having drawn the petals radially inwards in the process. The leaf spring members will consequently prevent the locking ring 21 from slipping down from a locked mode into an unlocked mode unless the operator intentionally grasps the leaf spring members and moves same radially inwardly so as to allow the locking ring 21 to slide down the receptacle into the unlocked mode.

The claims defining the invention are as follows:

1. A cupped receptacle adapted to releasably captivate and secure an umbrella handle of the type terminating in a bulb, said receptacle comprising a base portion extending into two or more upstanding arcuate petals defining the sides of the cupped receptacle and capable of resilient radial deflection, each petal having a main body and being forked towards its upper extremity at an included angle of between 10 and 30 degrees such that the main body of the petal diverges radially outwardly with respect to the internal leg of the fork; locking means slidable from a first position adjacent the lower extremity of the petals whereat the locking means does not prevent outward radial deflection of the petals, to a locked position about the upper extremities of the petals whereat the locking means prevents radially outward deflection of the petals and maintains the internal legs of the forks in a position such that an umbrella may be supported with its bulb captive within the base of the receptacle; and means adjacent the base of the receptacle to secure same to a stable object.

2. A receptacle in accordance with claim 1 wherein the petals are biassed to a closed position such that introduction of a bulb extends the petals radially outwardly and the petals return to their equilibrium closed position once the bulb has been moved past the internal legs of the forked petals and is seated adjacent the base of the receptacle.

3. A receptacle in accordance with claim 1 wherein the petals are biassed to an open position to facilitate easy introduction of the bulb of an umbrella handle and movement of said locking means to a locked position draws the petals radially inward.

4. A receptacle in accordance with claim 1 wherein the petals are biassed to an open position and the locking means is a ring having at least one internally directed lug adjacent the upper extremity of its internal face adapted to overlie the upper extremity of a petal when the ring is in the locked position, thereby preventing downward movement of the locking ring out of the locked position; the locking ring being capable of rotation with respect to the receptacle such that the internally directed lug may be aligned with a longitudinal cut forming a division between the petals to permit the locking ring to be drawn down the receptacle into an unlocked position.

5. A receptacle in accordance with claim 1 wherein the petals are biassed to an open position and the locking means is a ring; said receptacle further comprising means for retaining the locking ring in the locked position.

6. A receptacle in accordance with claim 5 wherein the means for retaining the locking ring in the locked position is at least one leaf spring formed by longitudinal cuts between adjacent petals affixed at its lower extremity to the main body of the receptacle and biassed such that when the locking ring is in its locked position adjacent the upper extremity of the petals, the upper free end of the leaf spring rests just below the lower extremity of the locking ring and outside the circumference of the adjacent petals so as to prevent downward movement of the locking ring with respect to the receptacle.

* * * * *